May 10, 1938.    G. PIELSTICK    2,117,036

ENGINE FRAME

Filed Oct. 23, 1935

Inventor
Gustav Pielstick
by Maréchal & Noe
attys.

Patented May 10, 1938

2,117,036

UNITED STATES PATENT OFFICE 2,117,036

ENGINE FRAME

Gustav Pielstick, Augsburg, Germany, assignor to Maschinenfabrik Augsburg-Nürnberg A. G., Augsburg, Germany, a corporation of Germany Application October 23, 1935, Serial No. 46,377
In Germany November 3, 1934

7 Claims. (Cl. 121—194)

This invention relates to engine frame construction, and more particularly to engine frames having tension members adapted to assume the forces created by combustion pressures.

One object of the invention is the provision of an engine frame having tension rods interconnecting the cylinders with the crankshaft bearing and so arranged as to obtain a correct alignment of the cylinders without requiring exceedingly accurate machining of the parts.

Another object of the invention is the provision of a combustion engine frame of the character mentioned in which the tension rods are pivotally connected to the crankshaft bearing, and each tension rod serves to secure a pair of adjacent cylinders in place.

Other objects and advantages of the invention will be apparent from the following description, the appended claims and the accompanying drawing, in which—

Figure 1:
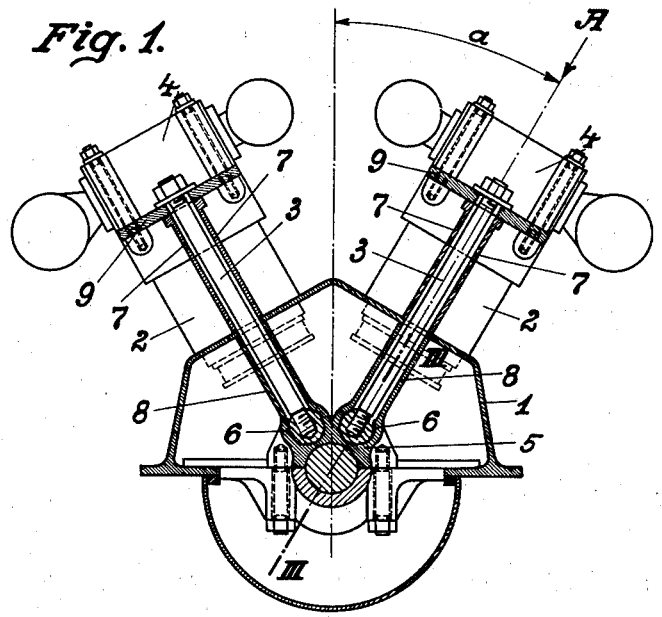
Fig. 1 is a vertical transverse section on the line I—I of Fig. 2 taken centrally between adjacent cylinders of an engine embodying the present invention.
Figure 2:
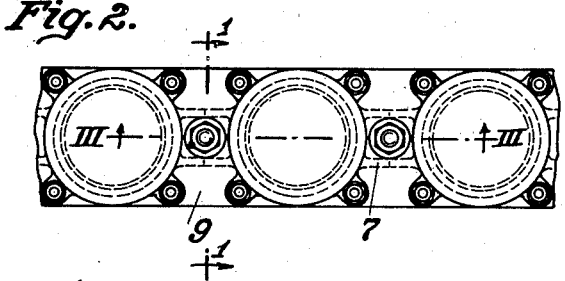
Fig. 2 is a plan view of a portion of one bank of cylinders as viewed looking in the direction of the arrow A of Fig. 1.
Figure 3:
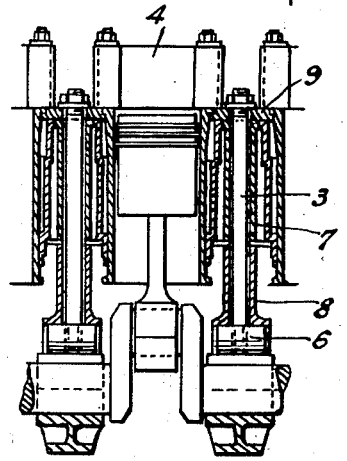
Fig. 3 is a section on the lines III—III of Figs. 1 and 2.

Referring more particularly to the drawing, the invention has been shown as applied to an internal combustion engine having two banks or rows of engine cylinders arranged in V formation, but it should be understood that the invention is also applicable to other engines in which there is a series of engine cylinders.

As will be apparent from the drawing the engine cylinders 2 are supported on a housing or crankcase wall I and are arranged in two series or rows, in V formation. Between each pair of adjacent cylinders in each series there is a tension member or rod 3 which serves to securely anchor the cylinder heads 4 with respect to the crankshaft bearing part 5 in which the crankshaft is rotatably supported. The lower end of each of the tensioned anchors 3 is in threaded engagement with a short cylindrical member 6 which is journalled in the bearing part 5 so that the longitudinal axis of tension rod 3 can be shifted. Each tension rod is substantially surrounded by box-like columns which are formed partly by flanges 7 which are cast integral with the cylinders 2 and project out towards one another and welded together, and partly by individual castings 8 which are connected with or a part of the crankshaft bearing part 5.

Extending throughout the length of each row of cylinders is a rigid metal plate 9 providing a frame member which is secured along the upper ends of the cylinders 2 as by bolts or welding or both. The plate is also bolted to the cylinder heads 4 of the row. The upper ends of the tension rods 3 are connected to this plate 9 for each row of cylinders, each tension rod extending out substantially radially from the bearing part 5 and connecting a pair of adjacent cylinders in place.

Due to the rotatable movement which the tension rods 3 have by reason of their pivotal support in the bearing member 5, the cylinders 2 can be readily and accurately secured on the housing walls I even though the angle $a$ between the axis of a cylinder and the central vertical plane of the engine does not accurately conform to the prescribed angle, due for example to somewhat inaccurate construction of the housing walls I. The arrangement of tension rods as herein described, is particularly advantageous for engines in which the frame is built up as by means of welded connections between the various parts, for in such case an unusually high degree of accuracy cannot be maintained in positioning the various parts of the engine frame, due to the error created by shrinkage and expansion in the welding operation. By using the tension rod arrangement of the present invention, it is unnecessary to machine the various parts extremely accurately, as a correct alignment of the cylinders can be obtained even though a small deviation in the location of a cylinder axis with respect to the other cylinders is produced during the tensioning of the tension rods. Furthermore, the stresses produced due to the combustion pressure in the cylinders are transmitted directly towards the center of the crankshaft bearing in such a way as to make it impossible to apply torsional strains to the crankshaft bearing itself. It will also be apparent that the construction as herein set forth gives a minimum number of tension rods as well as producing a direct connection radially toward the center of the crankshaft bearing.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An engine frame of the character described comprising a series of engine cylinders, a crankshaft bearing, cylinder supporting means between the cylinders and the bearing, and tension rods having a pivotal connection to said bearing between the cylinder axes and securing said cylinders to said bearing.

2. An engine frame of the character described comprising a series of engine cylinders, a crankshaft bearing, cylinder supporting means between the cylinders and the bearing, and a single tension rod located symmetrically between each adjacent pair of cylinders and arranged radially of the crankshaft bearing for securing said cylinders to said crankshaft bearing whereby said cylinders may seat on said cylinder supporting means irrespective of slight misalignments.

3. An engine frame of the character described comprising a row of cylinders, a crank shaft bearing, cylinder supporting means between the cylinders and the bearing, and a tension rod between each adjacent pair of cylinders securing the cylinders in place, each tension rod having a pivoted connection at one end thereof to the crankshaft bearing and a connection at the other end thereof to a pair of cylinders.

4. An engine frame comprising a row of cylinders, a cylinder head for each cylinder, crankcase walls and a crankshaft bearing supported by said walls, and a series of tension rods arranged in a common plane containing the axes of the cylinders and connecting the cylinder heads to the crankshaft bearing and holding the cylinders in position on the crankcase wall for the balance of forces on the crank shaft bearing to eliminate torsional strains thereon.

5. An engine frame of the character described comprising a row of engine cylinders, a crankshaft bearing, cylinder supporting means between the cylinders and the bearing, and tension rods connecting said bearing and cylinders, each tension rod having a cylindrical bearing portion at one end thereof pivotally supported in the crankshaft bearing for movement of the tension rod about an axis substantially transverse to its longitudinal axis.

6. An engine frame of the character described comprising a series of engine cylinders, a crank shaft bearing, a crank case supporting said bearing and said cylinders, a common frame member attached to outer portions of said cylinders, and a single tension rod located symmetrically between each adjacent pair of cylinders and arranged radially of the crank shaft bearing and securing said frame member to said crank shaft bearing whereby said cylinders may seat on said crank case irrespective of slight misalignments.

7. An engine frame of the character described comprising a row of cylinders, a crank shaft bearing, a crank case supporting said bearing, a common frame member attached to outer portions of said cylinders, and a tension rod between each adjacent pair of cylinders securing the cylinders in place on the crank case, each tension rod having a pivotal connection at one end thereof to the crank shaft bearing and a connection at the other end thereof to said frame member.

GUSTAV PIELSTICK.